US010254614B2

United States Patent
Cloots et al.

(10) Patent No.: US 10,254,614 B2
(45) Date of Patent: Apr. 9, 2019

(54) PROCESS OF ULTRASONIC SPRAY PYROLYSIS DEPOSITION OF ONE OR MORE ELECTROCHROMIC AND/OR ELECTROLYTIC FILMS ON A SUBSTRATE

(71) Applicants: UNIVERSITE DE LIEGE, Angleur (BE); INISMa, Mons (BE)

(72) Inventors: Rudi Cloots, Liège (BE); Catherine Henrist, Liège (BE); Jessica Denayer, Liège (BE); Anthony Maho, Liège (BE); Francis Cambier, Mons (BE); Véronique Lardot, Mons (BE); Geoffroy Bister, Mons (BE); Philippe Aubry, Mons (BE)

(73) Assignees: UNIVERSITE DE LIEGE, Angleur (BE); INISMA, Mons (BE)

( * ) Notice: Subject to any disclaimer, the term of this patent is extended or adjusted under 35 U.S.C. 154(b) by 0 days.

(21) Appl. No.: 15/535,433

(22) PCT Filed: Dec. 11, 2015

(86) PCT No.: PCT/EP2015/079508
§ 371 (c)(1),
(2) Date: Jun. 13, 2017

(87) PCT Pub. No.: WO2016/113050
PCT Pub. Date: Jul. 21, 2016

(65) Prior Publication Data
US 2017/0363928 A1 Dec. 21, 2017

Related U.S. Application Data

(60) Provisional application No. 62/103,262, filed on Jan. 14, 2015.

(51) Int. Cl.
*B05D 3/00* (2006.01)
*G02F 1/1523* (2019.01)
(Continued)

(52) U.S. Cl.
CPC ........ *G02F 1/1523* (2013.01); *C03C 17/3417* (2013.01); *C23C 18/1216* (2013.01);
(Continued)

(58) Field of Classification Search
CPC ............ C23C 18/1216; C23C 18/1258; C23C 18/1291; G02F 1/1523; G02F 1/1533; G02F 1/155; G02F 1/1347
See application file for complete search history.

(56) References Cited

U.S. PATENT DOCUMENTS 7,838,403 B1 * 11/2010 Liu .................... C23C 18/1204
438/584
8,780,432 B1 * 7/2014 Nguyen ................ G02F 1/1347
359/265

(Continued)

OTHER PUBLICATIONS

Bertus et al; Synthesis and characterization of WO3 thin films by surfactant assisted spray pyrolysis for electrochromic applications; Material Chemical and Physics, vol. 140, pp. 49-59; 2013 (Year: 2013).*

(Continued)

*Primary Examiner* — Michael P Wieczorek
(74) *Attorney, Agent, or Firm* — Jacobson Holman, PLLC.

(57) ABSTRACT

A process of making an electrochromic or an electrolytic film by Ultrasonic Spray Pyrolysis (USP) deposition on a substrate comprising:
mixing a surfactant to an aqueous precursor solution comprising an electrochromic component or an electrolytic component to provide a spray solution;
introducing the spray solution into an ultrasonic spray deposition nozzle at a constant flow rate between 0.1 mL/min and 2 mL/min and applying an ultrasonic frequency between 80 and 120 kHz to generate atomized droplets of the precursor solution;
(Continued)

entraining the atomized droplets with a controlled jet of air as gas carrier at a pressure between 0.50 to 2.0 psi, onto a pre-heated substrate at a temperature of 200 to 450° C.;

thermally converting the atomized droplets when depositing onto the pre-heated substrate to generate an electrochromic or an electrolytic film.

19 Claims, 8 Drawing Sheets

(51) Int. Cl.
    *C23C 18/12*      (2006.01)
    *H01B 1/08*      (2006.01)
    *G02F 1/15*      (2019.01)
    *C03C 17/34*      (2006.01)
    *G02F 1/1347*      (2006.01)
    *G02F 1/153*      (2006.01)
    *G02F 1/155*      (2006.01)
    *C23C 18/02*      (2006.01)

(52) U.S. Cl.
    CPC ...... *C23C 18/1225* (2013.01); *C23C 18/1258* (2013.01); *C23C 18/1291* (2013.01); *G02F 1/1347* (2013.01); *G02F 1/15* (2013.01); *G02F 1/155* (2013.01); *G02F 1/1521* (2013.01); *G02F 1/1525* (2013.01); *G02F 1/1533* (2013.01); *H01B 1/08* (2013.01); *C23C 18/02* (2013.01); *G02F 2202/38* (2013.01); *Y02P 20/129* (2015.11)

(56) References Cited

U.S. PATENT DOCUMENTS

2008/0193638 A1\* 8/2008 McMaster ............... C23C 18/02
                                                        427/126.3

2011/0260124 A1\* 10/2011 Gillaspie ............... C23C 18/06
                                                        252/586
2014/0085699 A1\* 3/2014 Huang ..................... G02F 1/15
                                                        359/270

OTHER PUBLICATIONS

International Search Report, dated Mar. 23, 2016 (4 pages).

Denayer et al., "Surfactant-assisted ultrasonic spray pyrolysis of nickel oxide and lithium-doped nickel thin films, toward electrochromic applications", Applied Surface Science, vol. 321, Dec. 2014, pp. 61-69.

Denayer et al., "Improved coloration contrast and electrochromic efficiency of tungsten oxide films thanks to a surfactant-assisted ultrasonic spray pyrolysis process", Solar Energy Materials & Solar Cells, vol. 130, Sep. 2014, pp. 623-628.

Chi-Ping Li et al., "Improved Durability of $WO_3$ Nanocomposite Films Using Atomic Layer Deposited Coatings", ECS Electrochemistry Letters, vol. 1, No. 5, 2012, pp. H24-H27.

Chi-Ping Li et al., "Electrochromic films produced by ultrasonic spray deposition of tungsten oxide nanoparticles", Solar Energy Materials & Solar Cells, vol. 99, 2012, pp. 50-55.

Chi-Ping Li et al., "Ultrasonic spray deposition of high performance WO3 films using template-assisted sol-gel chemistry", Electrochemistry Communications, vol. 25, 2012, pp. 62-65.

Chi-Ping Li et al., "The influence of sol-gel processing on the electrochromic properties of mesoporous $WO_3$ films produced by ultrasonic spray deposition", Solar Energy Materials & Solar Cells, vol. 121, 2014, pp. 163-170.

Zelazowska et al., "$WO_3$-based electrochromic system with hybrid organic-inorganic gel electrolytes", Journal of Non-Crystalline Solids, vol. 354, 2008, pp. 4500-4505.

Al-Kahlout et al., "Gelatin-based protonic electrolyte for electrochromic windows" Ionics, vol. 16, 2010, pp. 13-19.

\* cited by examiner

PROCESS OF ULTRASONIC SPRAY PYROLYSIS DEPOSITION OF ONE OR MORE ELECTROCHROMIC AND/OR ELECTROLYTIC FILMS ON A SUBSTRATE

BACKGROUND OF THE INVENTION

The present invention relates to a process of making an electrochromic or an electrolytic film by Ultrasonic Spray Pyrolysis (USP) deposition on a substrate, at atmospheric pressure. The present invention also relates to a multilayer stacking construction of the electrochromic and electrolytic films on the substrate.

DESCRIPTION OF RELATED ART

Ultrasonic Spray Pyrolysis is well-known in the art and has recently been applied by R. C. Tenent, particularly in US 2011/0260124 to the deposition of electrochromic metal oxide films.

Nevertheless the quality of the resulting films is not optimal, particularly in terms of homogeneity and electrochromic performances such as coloration contrast, coloration efficiency, reversibility, durability, switching kinetics, surface/interface defects. Moreover the process conditions are also to be improved to be efficient on a large-scale substrate at a moderate cost. Multilayers construction also needs to be improved regarding behaviour of the layers on the substrate (stability, performances . . . ) as well as the interface between the various layers.

R. C. Tenent teaches in US 2011/0260124 an electrochromic film such as lithium-doped nickel oxide (Li—NiO) deposited at atmospheric pressure onto the surface of a FTO (fluorine-doped tin oxide)-covered glass substrate wherein the oxide is generated by a pyrolysis reaction of an aqueous based precursor solution. Atomized droplets of the liquid precursor solution are generally carried by a nitrogen flow to the heated glass substrate on which the precursor solution is allowed to dry. During drying, a coating layer is created on the substrate. The coating layer may be completely or partially crystalline or amorphous.

R. C. Tenent also teaches in ECS Electrochemistry Letters 1 (2012) H24-H27 and in Solar Energy Materials and Solar Cells 99 (2012) 50-55 a process to carry out an electrochromic film of tungsten oxide $WO_3$.

The film is produced by a two steps process. Crystalline tungsten oxide nanoparticles are synthesized by hot-wire chemical vapor deposition. The nanoparticles are collected and dispersed in ethanol and subsequently employed to form electrochromic thin films using ultrasonic spray deposition at room temperature, followed by an annealing step at 300° C. during 2 hours to improve crystallinity. The $WO_3$ films are mesoporous as they result from nanoparticles stacking.

R. C. Tenent further teaches in Electrochemistry Communications 25 (2012) 62-6 and in Solar Energy Materials and Solar Cells 121 (2014) 163-170 a second process to carry out an electrochromic film of tungsten oxide.

The process adds a triblock polymer, a poly(ethylene glycol)-block-poly(propylene glycol)-block-poly(ethylene glycol)) in anhydrous ethanol (EtOH) to the precursor solution of tungsten hexachloride ($WCl_6$) in EtOH and uses ultrasonic spray deposition at room temperature followed by hydrolysis in water vapor chamber and annealing at 300-400° C. to complete transformation of $WCl_6$ into $WO_3$.

BRIEF SUMMARY OF THE INVENTION

The inventors have now found specific conditions for an improved USP deposition process on a substrate at atmospheric pressure using air as gas carrier of droplets made of an aqueous precursor solution, to produce one or more electrochromic or electrolytic films by pyrolysis of the atomized droplets onto the preheated substrate.

The process, which is common for the electrochromic and electrolytic film making, is advantageously performed without any additional annealing step.

Improved homogeneous thin electrochromic or electrolytic layer has also been obtained on large-scale substrates with high layer uniformity, perfect covering and improved electrochromic performances such as coloration efficiency, coloration contrast, low light diffusivity (haze), good cycling reversibility, durability, switching kinetics.

Finally, a multilayer stacking construction comprising at least one electrochromic and at least one electrolytic layer on a substrate is generated according to the process of the invention with a surprisingly good cycling reversibility.

The electrochromic film according to the invention is a metal oxide film comprising a metal oxide selected from tungsten oxide, molybdenum oxide, niobium oxide, titanium oxide, copper oxide, chromium oxide, manganese oxide, vanadium oxide, tantalum oxide, iron oxide, cobalt oxide, nickel oxide, ruthenium oxide, rhodium oxide, palladium oxide, osmium oxide, iridium oxide, platinum oxide and a combination thereof.

The electrochromic film may also comprise a dopant element.

The dopant element for the electrochromic film is selected from hydrogen ion, deuterium ion, lithium ion, sodium ion, potassium ion, rubidium ion, caesium ion, molybdenum ion, titanium ion, vanadium ion, calcium ion, barium ion, magnesium ion, strontium ion, tungsten ion, nickel ion or a combination thereof.

The electrolytic film according to the invention is a metal oxide matrix comprising an alkali ion selected from lithium, sodium, potassium, rubidium, caesium or a combination thereof. The alkali metal ion may alternatively be replaced by a proton.

The metal oxide matrix is generally made from a main oxide, provided by a main oxide precursor, a secondary oxide, also called a modifying oxide, provided by a secondary oxide precursor and a proton or an alkali ion source such as a lithium source material.

The alkali ion source, the main and secondary oxide precursors are electrolytic components of the electrolytic precursor solution.

The lithium source material may be a lithium salt, for example lithium nitrate $LiNO_3$, lithium chloride $LiCl$ or lithium sulfate $Li_2SO_4$ or an organic soluble salt, a complex of lithium such as lithium acetate and lithium citrate.

The sodium source material may be sodium salt, for example sodium nitrate $NaNO_3$, sodium chloride $NaCl$ or sodium sulfate $Na_2SO_4$ or an organic soluble salt, a complex of sodium such as sodium acetate and sodium citrate. Similar alkali source materials are available for the other above-mentioned alkali.

The main oxide precursor may be for example tetraethylorthosilicate also called silicon tetraethoxide and represented by $Si(OC_2H_5)_4$ or TEOS. Alternatively silicon alkoxides $Si(OR)_4$ may also be suitable wherein R is an alkyl group such as for example methyl, propyl and the like.

The secondary oxide precursor may be for example $Al(NO_3)_3 \cdot 9H_2O$, $H_3BO_3$ or $H_3PO_4$ for the generation of respectively lithium aluminosilicate (LAS), lithium borosilicate (LBS) and lithium phosphosilicate (LPS) or a combination thereof. Other oxides such as oxide of Ti, Zn, Ge, Se, Zr, Nb, Mo, In, Sn, La and Ta or a combination thereof may also be considered as secondary oxide precursors.

For example the electrolytic film may be constituted of lithium oxide, silicon oxide and aluminium oxide/boron oxide/phosphorous oxide in case of LAS/LBS/LPS (respectively). $Li^+$ ions contained in lithium oxide $Li_2O$ are mobile and therefore responsible of the ionic conductivity within the film.

The process according to the invention comprises as a first step, a mixing preferably at room temperature of a surfactant to an aqueous precursor solution. The aqueous precursor solution may also be replaced by an organic precursor solution with organic solvents such as ethanol, methanol, dimethylformamide, tetrahydrofuran and the like, or a combination thereof.

A precursor solution is generally defined as an organic or inorganic solvent such as water or a combination thereof, containing dispersed components. The components are electrochromic or electrolytic components that can be dispersed as soluble or colloidal species. A precursor solution may be for example a solution or colloidal suspension or emulsion or a mixture thereof.

The aqueous precursor solution for the electrochromic film comprises an electrochromic component that can be an organic or inorganic salt or complex, selected from nitrate, chloride, acetate, acetylacetonate, citrate, sulfate, containing metals selected from tungsten, molybdenum, niobium, titanium, copper, chromium, manganese, vanadium, tantalum, iron, cobalt, nickel, ruthenium, rhodium, palladium, osmium, iridium, platinum, or a combination thereof.

The aqueous precursor solution for the electrolytic film comprises electrolytic components such as a proton source or an alcali ion source. For example, a lithium ion source material is selected from lithium nitrate, lithium chloride, lithium sulfate, or a combination thereof. The aqueous precursor solution for the electrolytic film also comprises a main oxide precursor such as silicon alkoxide; and a secondary oxide precursor also called modifying oxide precursor such as aluminium nitrate, aluminium chloride, zinc nitrate, zinc chloride, nitric acid, boric acid, phosphoric acid, or a combination thereof.

The surfactant according to the invention is selected from non-ionic or ionic compounds. Non-ionic surfactant can be polyethylene glycol with different molecular weights (preferably with a molecular weight of 400, 600, 1500), or a combination thereof. Ionic surfactant may be anionic (e.g. sodium dodecyl sulfate) or cationic (e.g. cetyltrimethylammonium bromide) compounds, or a combination thereof. A combination of ionic and non-ionic surfactants can also be used. The surfactant is added to the precursor solution for the electrochromic as well as the electrolytic film formation.

Most preferred is polyethylene glycol with molecular weight (Mw) of 400.

When using polyethylene glycol, the weight ratio of the electrochromic component to polyethylene glycol is between 10:1 and 1:10, preferably 1:10 when using PEG Mw 400 for $WO_3$ films and 1:3 for Li—NiO films. The weight ratio of the electrolytic component (such as LiNO3) to polyethylene glycol is preferably 1:300 when using PEG Mw 400 for LAS films.

The surfactant incorporation in the aqueous or organic precursor solution aims at lowering the surface tension to generate smaller droplets at the ultrasonic spraying nozzle and improves their wettability when deposited onto the heated substrate. The surfactant in the precursor solution also influences the solution viscosity and may prevent coalescence or aggregation of particles when the film will be formed.

Therefore, such a surfactant-containing precursor solution is introduced as a spray solution into an ultrasonic spray nozzle.

Once the spray solution is introduced into the ultrasonic spray nozzle, a frequency between 80 and 120 kHz, preferably 120 kHz is applied to the nozzle to generate atomized droplets of the precursor solution.

The spray solution is maintained at a constant flow rate that may vary from 0.1 to 2.0 mL/min depending of the nozzle design. The constant flow rate is preferably between 0.1 to 0.4 mL/min and most preferably 0.25 mL/min for an atomizing nozzle with an apical or horizontal geometry.

The atomized droplets are further moved from the orifice of the spray nozzle to a pre-heated substrate by a controlled flow of air gas.

Air gas can be pure air, dry air or air gas mixed with another gas such as argon.

The low pressure air gas is between 0.50 and 2.0 psi, preferably 0.90 psi.

The nozzle has a specific spraying geometry, which may be apical (such as for AccuMist spray nozzle from Sono-Tek) or horizontal (such as for Impact Edge spray nozzle from Sono-Tek) regarding the substrate. Additionally, a flat jet air deflector may be used to control the move of the atomized droplets towards the substrate.

The substrate is preheated at a temperature between 200 and 450° C., preferably 350° C. The droplets are thermally transformed when deposited onto the pre-heated substrate and further generate a uniform electrochromic or electrolytic film.

By thermal conversion or thermally transformed, one means the whole set of chemical, physicochemical reactions and physical transformations promoted by heat that occurs when the atomized droplets are deposited on the pre-heated substrate during the USP process. For example the thermal conversion may include pyrolysis, thermolysis, hydrolysis, condensation, combustion, decomposition, oxidations, chemical equilibrium displacement, drying, dehydration, intumescence, effervescence, any phase transformation (melting, condensation, vaporization, sublimation, deposition, solid phase transformation, crystallization), densification, shrinkage, sintering and the like.

The substrate according to the invention may be glass, tempered or not, which may be covered by a transparent conductive oxide (TCO) layer made of indium oxide, doped indium oxide, tin oxide, doped tin oxide, zinc oxide, doped zinc oxide, ruthenium oxide, doped ruthenium oxide or any other transparent conductive oxide with adequate sheet resistance properties. The dopant element may be fluorine, zinc, indium, aluminium. Glass substrate may further content a sodium diffusion barrier between the glass bulk substrate and the conductive layer. The substrate may also be a polymer or a metallic sheet.

The substrate may have any kind of surface geometry as plane and non plane such as for example flat glass for windows, windshields, curved mirror, lens, glassware or decorative objects.

In a preferred embodiment of the present invention, the process of ultrasonic spray deposition uses a 3-dimension deposition pattern to generate the electrochromic or electrolytic film. The 3-dimension pattern design is preferably carried out according to a S-shaped arc move in the x,y-plane, by an atomizing nozzle with an apical or horizontal geometry.

The process of ultrasonic spray pyrolysis deposition may be repeated 2 to 16 times, preferably between 6 to 10 times to generate a thin uniform electrochromic or electrolytic layer with a thickness between 100 to 1000 nm, preferably 200-400 nm.

In the case of an electrochromic layer made of nickel oxide doped with lithium (Li—NiO), 10 deposition passages are preferably performed resulting in a thickness of 260-270 nm, whereas 6 deposition passages are preferably performed in the case of an electrochromic layer made of tungsten oxide ($WO_3$), resulting in a thickness 220-230 nm. Regarding the case of a lithium aluminosilicate electrolytic layer, 6 to 8 deposition passages are preferably performed resulting in a thickness of 360-370 nm.

The deposition follows a "x,y" patterning above the surface of the substrate according to an arc pattern with S-shaped move (1-6 mm spacing, preferably 4 mm spacing; by spacing it is intended the distance between two nozzle runs) at a constant speed of 5-50 mm/s, preferably 40 mm/s, with a constant z distance between nozzle and substrate of 3-6 cm, preferably 5.5 cm. The "x,y" deposition may be repeated 2-16 times keeping exactly the same pattern every odd passages (meaning passages #1, 3, 5 etc.) and shifting "x" or "y" coordinates by half of the spacing value every even passages (meaning passages #2, 4, 6 etc.), this in order to promote the formation of homogeneous and smooth deposited layers rather than furrowed ones.

The process according to the invention further comprises a plurality of deposition steps to generate a multilayer stacking construction of electrochromic and electrolytic layers. For example the process may generate an electrochromic/electrolytic bilayer or an electrochromic/electrolytic/electrochromic trilayer, preferably a lithium-doped nickel oxide/LAS or tungsten oxide/LAS bilayer, or lithium-doped nickel oxide/LAS/tungsten oxide or tungsten oxide/LAS/lithium-doped nickel oxide trilayer.

When generating an electrochromic/electrolytic bilayer, the process according to the invention may further comprise a third deposition step of a film, acting as counter electrode to the electrochromic first layer acting as working electrode. This counter electrode may be a second electrochromic film. The choice of appropriate electrochromic working and counter electrode materials relies on their electrical, electrochemical and optical complementarity and is well known by the man skilled in the art.

Another object of the invention relates to a multilayer stacking construction of electrochromic and electrolytic layers.

One advantage of such bi- or triple layers construction, particularly after that a conductive top layer was deposited above it, is the straightforward elaboration at atmospheric pressure of a fully-functional "all solid" multilayer stacking construction, presenting excellent visual aspect with high homogeneity and few or no visual morphological defects. The multilayer stacking construction also shows excellent electrochemical, electrochromic and optical characteristics in terms of coloration contrast, coloration efficiency, low light scattering (quantified by haze), reversibility, durability, and switching kinetics.

The conductive top layer is typically transparent, preferably with a percent transmission greater than 80% for neutral materials, but can be lower with colored materials. The conductive top layer may be made from different materials such as thin metallic coatings including gold, silver, platinum, or conductive oxides including indium oxide, tin oxide, zinc oxide. Such conductive oxides may be doped with elements such as fluorine, aluminium, tin, indium, antimony, or zinc. Typical examples of transparent conductive oxides are indium tin oxide (ITO), fluorine-doped tin oxide (FTO), aluminium-doped zinc oxide (AZO), antimony-doped tin oxide (ATO). Alternatively, the top layer may be translucent when transparency is not required such as with ground glass, opalin glass and the like.

The conductive top layer may be deposited on the substrate by different processes including chemical vapour deposition (CVD) and physical vapour deposition (PVD) processes such as metal organic chemical vapour deposition, magnetron sputtering, pulsed laser deposition, spray pyrolysis and ultrasonic spray pyrolysis.

For purpose of interpreting the specification, the following terms shall be given the meaning set forth below:

By Coloration Efficiency (CE) it is intended a parameter defined by $CE=\log(T_b/T_c)/Q$ (expressed in $cm^2/C$) wherein $T_b$ and $T_c$ represent transmission of the bleached and colored states (respectively) and Q represents the charge per area (expressed in $C/cm^2$). However, some authors prefer to use the following equation: $CE=\ln(T_b/T_c)/Q$ (expressed in $cm^2/C$), which results in different CE values. All reported values hereafter are obtained following log-based definition.

By coloration contrast (or transmittance modulation) it is intended the transmittance difference between $T_b$ and $T_c$.

By reversibility it is intended the ratio between the charge extracted (or anodic, $Q_a$) and inserted (or cathodic, $Q_c$).

By durability it is intended the evolution of reversibility value with electrochemical cycling (cyclic voltammetry). The more reversibility is stable and close to 100% over a large number of cycles, the more the device is considered as durable.

By switching kinetics, or coloration and bleaching times, it is intended the duration required to reach 90% of the total transmittance change.

By light scattering quantification or haze it is intended the percentage of diffuse transmittance of bleached oxide films, which is evaluated according to the ASTM D1003.

DETAILED DESCRIPTION OF THE INVENTION

The process according to the invention is now illustrated in the following examples using Glass/TCO as substrate, wherein TCO is fluorine-doped tin oxide (FTO).

Figure 9:
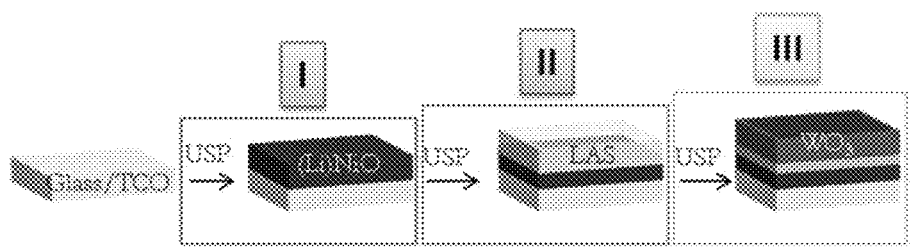
FIG. 9 illustrates the progressive stacking of electrochromic and electrolytic layers obtained through USP (standing for Ultrasonic Spray Pyrolysis) deposition process according to the invention, in a multilayer configuration made of lithium-doped nickel oxide (layer I)/lithium aluminosilicate (layer II)/tungsten oxide (layer III). TCO stands for transparent conductive oxide layer.

Different mono- or/and multilayered systems were obtained according to the following scheme:

An Ultrasonic Spray Pyrolysis (USP) deposition of individual electrochromic stoichiometric or non-stoichiometric lithiated nickel oxide layer Li$_y$—NiO$_x$ (further denoted as "Li—NiO"), electrochromic stoichiometric or non-stoichiometric tungsten oxide layer WO$_{(3-y)}$ (further denoted as "WO$_3$") and electrolytic lithium aluminosilicate (further denoted as "LAS") layer (see step I of FIG. 9);

An USP deposition of electrochromic+electrolytic bilayers, following different combinations: Li—NiO/LAS or WO$_3$/LAS (see step II of FIG. 9);

An USP deposition of electrochromic+electrolytic+electrochromic trilayers, following different deposition orders: Li—NiO/LAS/WO$_3$ or WO$_3$/LAS/Li—NiO (see step III of FIG. 9).

FIG. 9: progressive stacking of electrochromic and electrolytic layers obtained through USP (standing for Ultrasonic Spray Pyrolysis) deposition process according to the invention, in the representative case of a lithium-doped nickel oxide/lithium aluminosilicate/tungsten oxide multilayer stacking. TCO stands for transparent conductive oxide layer.

The process according to the invention may comprise the following steps:

1. Preparation of a spray solution from the precursor solution of electrochromic or electrolytic layer; one or more surfactants may be incorporated to this precursor solution;

2. Ultrasonic spraying of the spray solution onto the pre-heated Glass/TCO substrate according to a x,y-move arc pattern (which can be repeated several times) of the spray nozzle at a constant z distance above the whole substrate: the ultrasonically produced spray is entrained in a gas stream (air) onto the heated surface, where the deposited atomized droplets undergo a thermal conversion reaction resulting in the generation of a thin oxide film presenting electrochromic or electrolytic features;

3. In the case of a stacking procedure, targeting the elaboration of a full solid inorganic electrochromic device, steps 1 and 2 above are repeated with precursor solutions of electrochromic layer (WO$_3$ or Li—NiO; step 1) and electrolytic layer (LAS; step 2) to generate a bilayered (electrochromic+electrolytic) or a trilayered (electrochromic+electrolytic+electrochromic) stacking onto the Glass/TCO substrate. However, a single electrochromic monolayer (Li—NiO or WO$_3$) can also be used as a constituent in another stacking construction for electrochromic device (for instance, through lamination with another electrochromic layer and an electrolyte layer based on polymer gels or other materials—by lamination it is intended the permanent assembly of two separate materials by the action of pressure, heat or adhesive strengths; for such stacking construction the man skilled in the art will refer for instance to Zelazowska et al. in Journal of Non-Crystalline Solids 354 (2008) 4500-4505, Al-Kahlout et al. in Ionics 16 (2010) 13-19, . . . ).

4. A conductive top layer as described above is deposited on the multilayer stacking.

Experimental Protocols in Our Process According to the Invention

Figure 1:
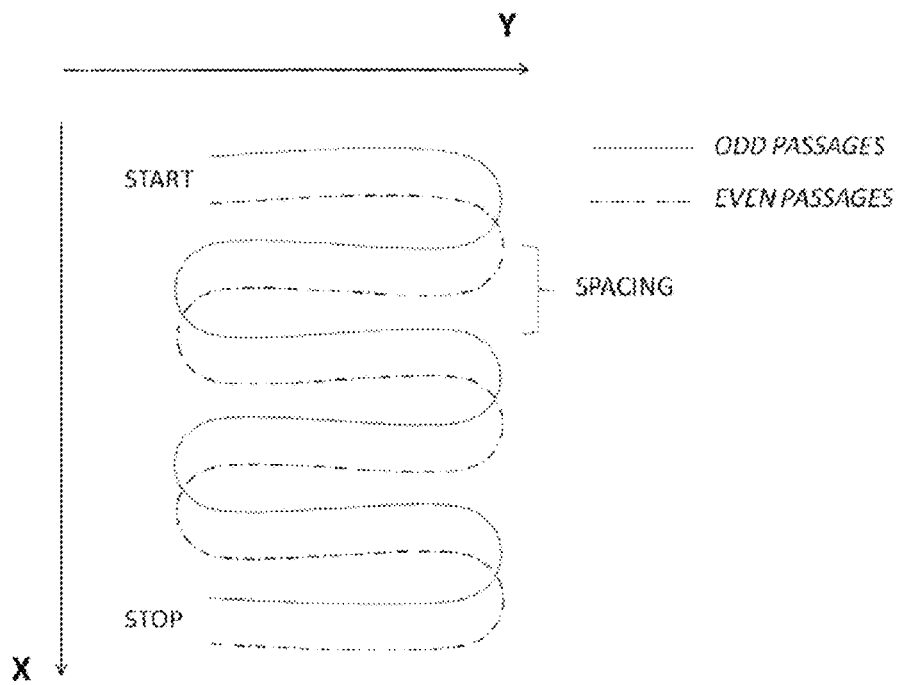
FIG. 1 illustrates the arc pattern according to which the ultrasonic spray nozzle is moved above the substrate surface during the ultrasonic spray deposition process. Typical spacing value between two arcs is 4 mm. The deposition pattern may be repeated 2-16 times, keeping exactly the same pattern every odd passages and shifting "x" or "y" coordinates by half of the spacing value (here 2 mm) every even passages.

Experimental protocols involve 2.0×2.0×0.4 cm Glass/FTO substrates (Planibel GFast, 15 ohm/square). "Standard" parameters for USP deposition rely on the use of the Exactacoat USP device from Sono-Tek, with AccuMist ultrasonic nozzle, with apical spraying geometry, operated at 120 kHz. Solution flow rate is maintained constant at 0.25 mL/min, with clean air as carrier gas at 0.90 psi. The ultrasonically produced spray at the tip of the nozzle is then apically entrained in the low pressure air stream to finally reach the substrate, which temperature is set to 350° C. Deposition follows a "x,y" patterning above the surface according to an arc pattern with a S-shaped move (4 mm spacing) at a constant speed of 40 mm/s, with a constant z distance between nozzle and substrate of 5.5 cm. The substrates are maintained 5 min before and after the spraying on a heating plate to reach the desired temperature of 350° C. at the surface of the substrate before spraying and to promote the decomposition of the precursor after spraying. The "x,y" deposition is repeated several times keeping exactly the same pattern every odd passages and shifting "x" or "y" coordinates by 2 mm every even passages (see FIG. 1).

Parameters proper to each individual layer:

Li—NiO electrochromic layer (I on Scheme 1): the precursor solution is made of 0.1 M $NiNO_3.6H_2O+LiNO_3$ 5% wt in purified $H_2O$+polyethylene glycol (PEG) surfactant of Mw 400 (at a weight ratio $m_{NiNO3}$:$m_{PEG}$=1:3). USP deposition is performed by 10 consecutive passages of the AccuMist nozzle above the whole Glass/FTO surface. The resulting layers properties are described in the following Table 1 and illustrate a high reversibility, very fast coloration and bleaching times, a high coloration contrast, a very high coloration efficiency, and a quite low haze for such an electrochromic Li—NiO layer.

LAS electrolytic layer (II on Scheme 1): the layer is synthezised from a sol-gel protocol in a EtOH/(purified)$H_2O$ solution with a 0.13 weight ratio, and is constituted of $Al_2O_3$ 25% mol (from $Al(NO_3)_3.9H_2O$~1.1 M), $Li_2O$ 25% mol (from $LiNO_3$ ~1.1 M), and $SiO_2$ 50% mol (from TEOS $Si(OCH_2CH_3)_4$~1.1 M; $H_2O$/TEOS=32.43). Precursor solution pH is fixed at 0.22 (adjusted with $HNO_3$), before being diluted in $H_2O$ by a 50 factor. The PEG surfactant of Mw 400 is then added (6.0 g) to 20.0 mL of the diluted solution. USP deposition is performed by 6 to 8 consecutive passages. The resulting layers properties are described in the following Table 2 and illustrates a low haze with a high conductivity for such an electrochromic solid LAS layer.

Figure 2:
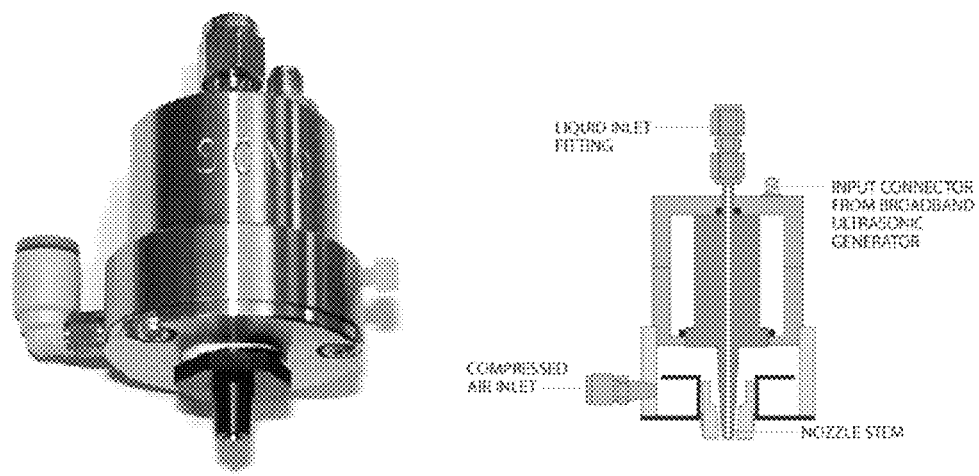
FIG. 2 illustrates the AccuMist spray nozzle and its schematic representation (manufactured by Sono-Tek). This nozzle is used in the process according to the present invention.
Figure 3:
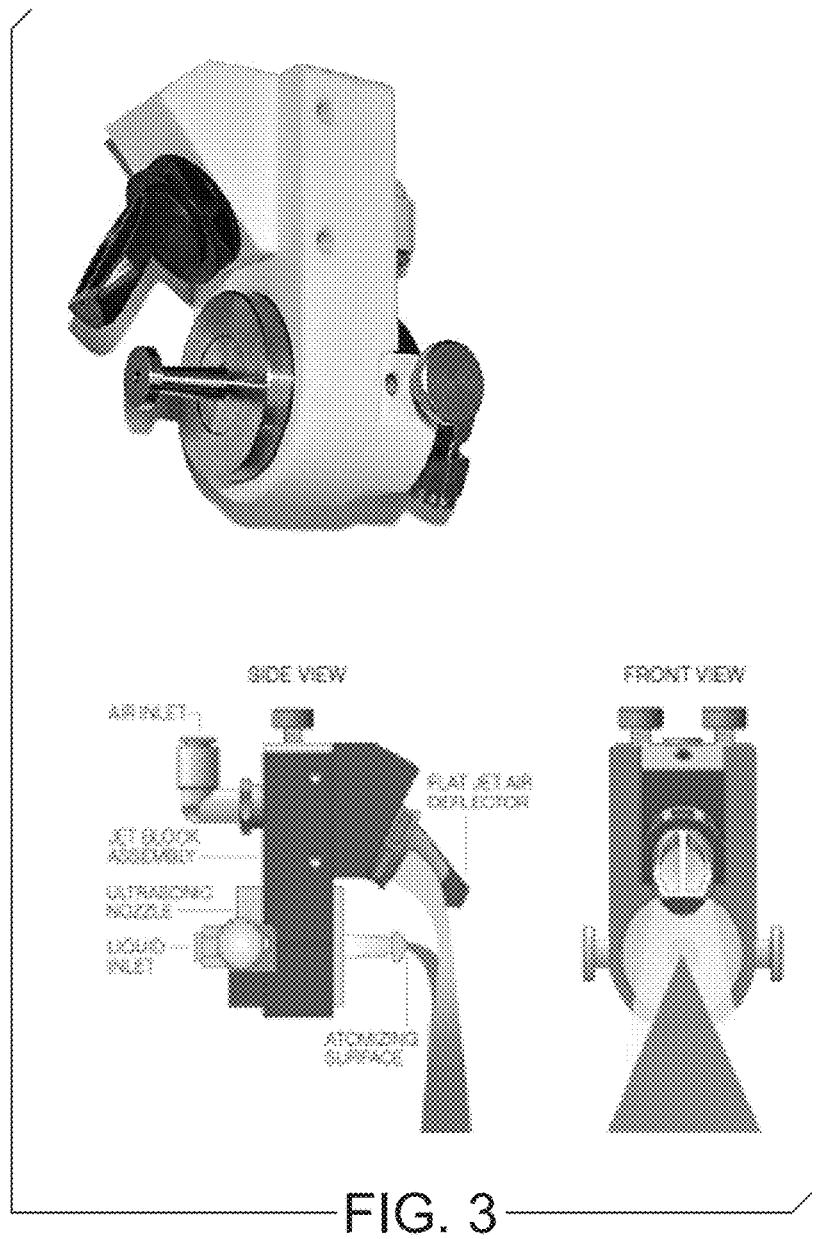
FIG. 3 illustrates the impact Edge spray nozzle and its schematic representation (manufactured by Sono-Tek)). This nozzle can also be used in the process according to the present invention, especially on large scale substrates.

$WO_3$ electrochromic layer (III on Scheme 1): the precursor solution is made of 0.01 M ammonium metatungstate AMT $((NH_4)_6W_{12}O_{39}.4H_2O)$ in purified $H_2O$+ PEG surfactant of Mw 400 (at a weight ratio $m_{AMT}$:$m_{PEG}$=1:10). USP deposition is performed by 6 consecutive passages. The resulting layers properties are described in the following Table 3 and illustrate a very high reversibility, moderately fast coloration and bleaching times, a very high coloration contrast, a high coloration efficiency, and a moderately low haze for such an electrochromic $WO_3$ layer Example with Different Nozzles:

Two different nozzle types were tested. AccuMist nozzle (Sono-Tek) (see FIG. 2) implies an apical spraying geometry, very useful in a 3D pattern as described above, while Impact Edge nozzle (Sono-Tek) (see FIG. 3) creates a fan-shaped spray pattern, which can be more suitable for larger size surfaces of (at least) 10×10×0.4 cm (Glass/FTO substrates).

Main Characteristics of Individual Layers Obtained Through Our Process According to the Invention

TABLE 1 properties (optimal performances at room temperature) of Li—NiO layers obtained through the process according to the invention carried out with a spray nozzle.

| Li—NiO | Thickness (nm) | 260-270 |
|---|---|---|
| | Roughness (nm) | 6 |
| | Crystal phase | Cubic $Li_{0.2}Ni_{1.8}O_2$ |
| | Reversibility-First CV cycle (%) | 84 (*) |
| | Coloration time-$t_c$ (s) | 6 (**) |
| | Bleaching time-$t_b$ (s) | 5 (**) |
| | Coloration contrast $T_b$-$T_c$ (%) ($\lambda$ = 550 nm) | 54 (85-31) (**) |
| | Coloration efficiency = $\log(T_b/T_c)/Q(cm^2/C)$ | 41.2 |

TABLE 1-continued properties (optimal performances at room temperature) of Li—NiO layers obtained through the process according to the invention carried out with a spray nozzle.

| L*/a*/b* parameters: colored state-bleached state | 73.8/1.9/8.6-95.5/−0.6/2.6 |
|---|---|
| Haze (%) | 1.0-1.3 |

TABLE 2 properties (optimal performances at room temperature) of LAS layers obtained through the process according to the invention carried out with a spray nozzle.

| LAS | Thickness (nm) | 360-370 |
|---|---|---|
| | Roughness (nm) | 46 |
| | Crystal phase | Amorphous |
| | Reversibility-First CV cycle (%) | No application |
| | Coloration time-$t_c$ (s) | No application |
| | Bleaching time-$t_b$ (s) | No application |
| | Coloration contrast $T_b$-$T_c$ (%) $\lambda$ = 550 nm | No application |
| | Coloration efficiency = $\log(T_b/T_c)/Q(cm^2/C)$ | No application |
| | L*/a*/b* parameters: colored state-bleached state | No application |
| | Haze (%) | 1.2-2.0 |
| | Conductivity (S/cm) | $1.45 \times 10^{-6}$ |

TABLE 3 properties (optimal performances at room temperature) of $WO_3$ layers obtained through the process according to the invention carried out with a spray nozzle.

| $WO_3$ | Thickness (nm) | 220-230 |
|---|---|---|
| | Roughness (nm) | 2-4 |
| | Crystal phase | Amorphous |
| | Reversibility-First CV cycle (%) | 94 (*) |
| | Coloration time-$t_c$ (s) | 28 (**) |
| | Bleaching time-$t_b$ (s) | 11 (**) |
| | Coloration contrast $T_b$-$T_c$ (%) $\lambda$ = 550 nm | 83 (91-8) (**) |
| | Coloration efficiency = $\log(T_b/T_c)/Q$ $(cm^2/C)$ | 26.1 |
| | L*/a*/b* parameters: colored state-bleached state | 35.0/5.0/−29.9-98.6/−0.2/0.5 |
| | Haze (%) | 1.6-2.1 |

Figure 4:
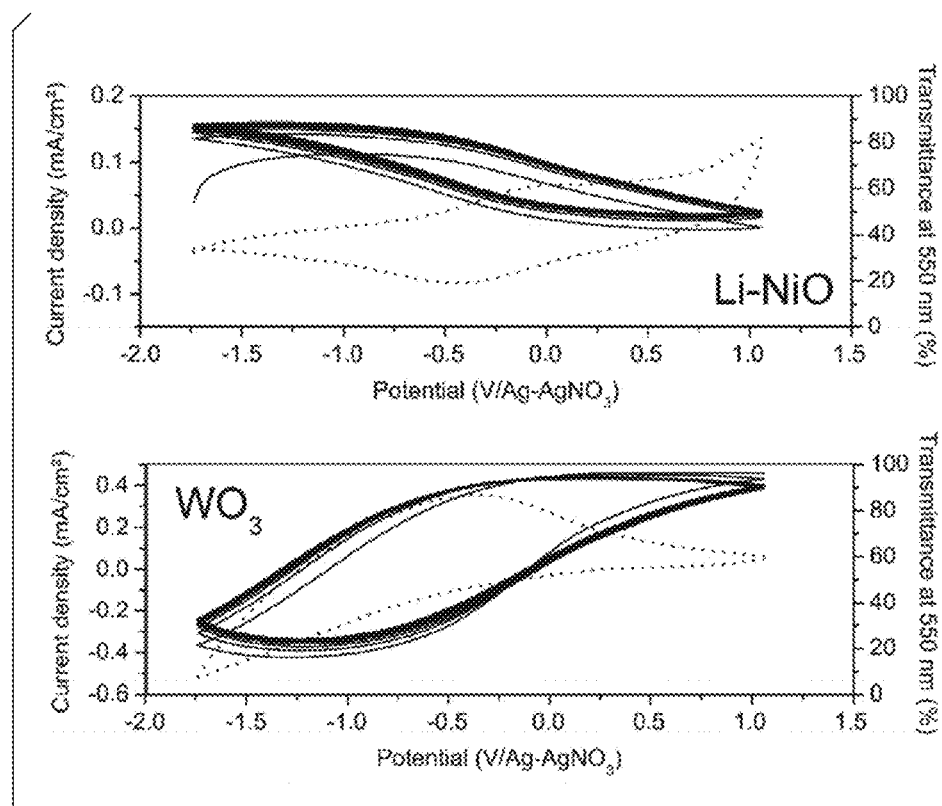
FIG. 4 illustrates cyclic voltammograms (dash lines)/transmittance (solid lines) curves obtained for electrochromic films deposited by the process according to the invention. An evolution of transmittance (λ=550 nm) and current density vs. potential (10 cycles, 20 mV/s) is reported from −1.74 to +1.06 V/Ag—$AgNO_3$, in 0.5 M $LiClO_4$/propylene carbonate for Li—NiO (up) and $WO_3$ (down) electrochromic films deposited through USP at 350° C. on Glass/FTO substrates.
Figure 5:
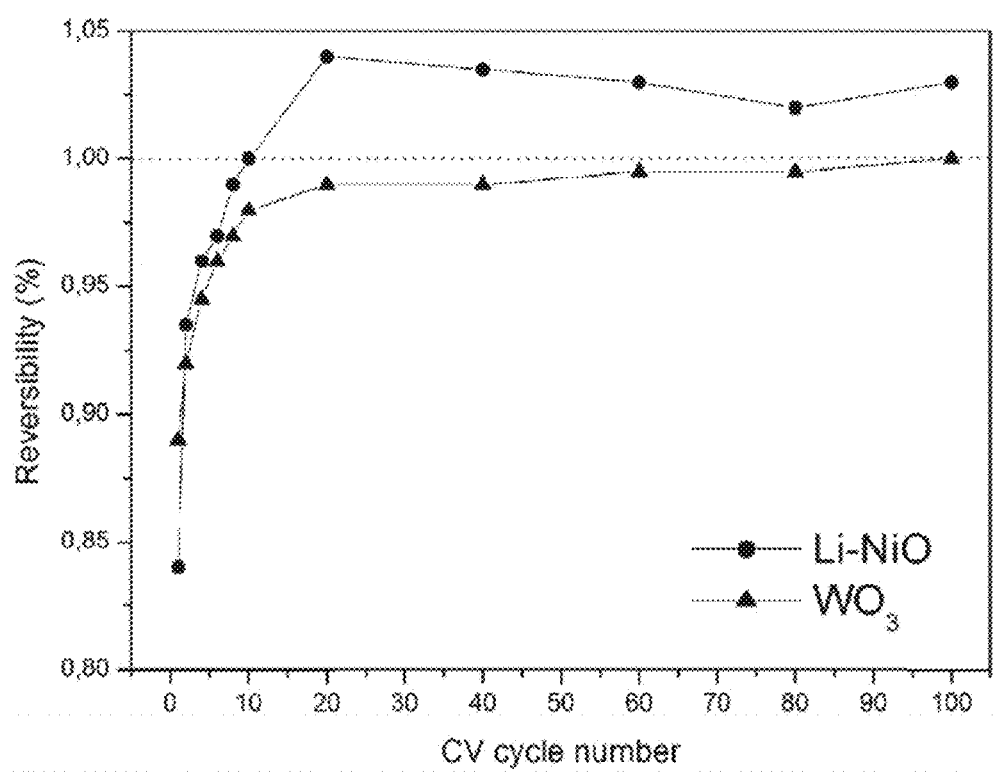
FIG. 5 illustrates evolution of reversibility during cyclic voltammetry (20 mV/s, from −1.74 to +1.06 V/Ag-$AgNO_3$, 100 cycles, 0.5 M LiClO$_4$/propylene carbonate solution) of Li—NiO (curve with dots) and WO$_3$ (curve with triangles) electrochromic films deposited through USP at 350° C. on Glass/FTO substrates.

(*) Cyclic voltammograms/transmittance curves and evolution of reversibility upon cycling are presented on FIGS. 4 and 5, respectively.

Figure 6:
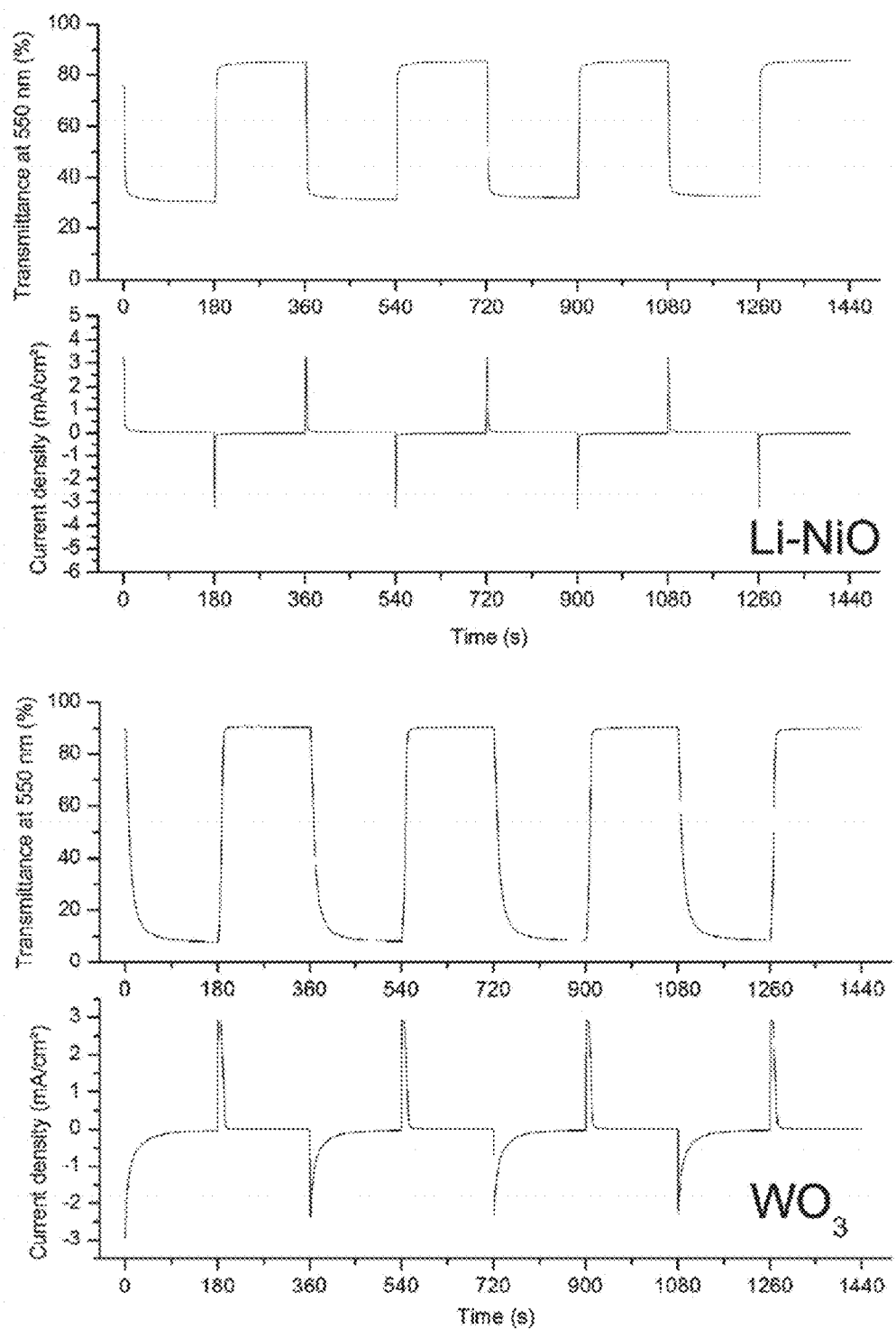
FIG. 6 illustrates evolution of transmittance ($\lambda$=550 nm) related to double-step chronoamperometry (current density vs. time) curves measured in 0.5 M LiClO$_4$/propylene carbonate solution of Li—NiO (up) and WO$_3$ (down) electrochromic films deposited through USP at 350° C. on Glass/FTO substrates. Potential values of +1.06 and −1.74 V/Ag—AgNO$_3$ are consecutively applied for 3 min (each step) for promoting the coloration and bleaching (respectively) of Li—NiO films, while potential values of −1.74 and +1.06 V/Ag—AgNO$_3$ are consecutively applied for 3 min (each step) for promoting the coloration and bleaching (respectively) of WO$_3$ films. 4 cycles of measurements are recorded in each case.

(**) Double-step chronoamperometry/transmittance curves are presented on FIG. 6.

Example of reversibility and stability of the electrochromic films obtained by the process according to the invention.

A cyclic voltammetry and transmittance measurement was performed in 0.5 M $LiClO_4$/propylene carbonate solution on an electrochromic film of Li—NiO and $WO_3$ deposited through USP at 350° C. on a glass/FTO substrate.

FIG. 4 illustrates transmittance at $\lambda$=550 nm and current density vs. potential (10 cycles, 20 mV/s) reported from −1.74 to +1.06 V/Ag—$AgNO_3$, and illustrates a good reversibility of respectively 84 and 94% for Li—NiO and $WO_3$ electrochromic films prepared according to the process of the invention.

FIG. 5 illustrates an evolution of reversibility during the cyclic voltammetry measurement at 20 mV/s from −1.74 to +1.06 V/Ag—AgNO$_3$ during 100 cycles for Li—NiO and WO$_3$ electrochromic films. Both films remain stable (reversibility values always closer to 100%) during the 100 cycles test.

Example of coloration/bleaching performances of the electrochromic films obtained by the process according to the invention The general working principle of the electrochromic device is based on the reversible double electrochemical injection of positive ions (Li$^+$) and electrons inside and outside the networks of WO$_3$ (working electrode, WE) and Li—NiO (counter electrode, CE) layers. The coloration mechanism involves the reduction of W and Li$^+$ insertion at the WE (cathodic coloration) simultaneously to the oxidation of Ni and Li$^+$ extraction at the CE (anodic coloration). The bleaching mechanism is based on the opposite processes, and both mechanisms are fully reversible.

A chronoamperometry measurement was performed in 0.5 M LiClO$_4$/propylene carbonate solution on an electrochromic film of Li—NiO and WO$_3$ deposited through USP at 350° C. on a glass/FTO substrate. FIG. 6 illustrates the evolution of transmittance at 550 nm related to double-step chronoamperometry (current density vs. time) curves for which potential values of +1.06 and −1.74 V/Ag—AgNO$_3$ are consecutively applied for 3 min (each step) for promoting the coloration and bleaching (respectively) of Li—NiO films, while potential values of −1.74 and +1.06 V/Ag—AgNO$_3$ are consecutively applied for 3 min (each step) for promoting the coloration and bleaching (respectively) of WO$_3$ films. 4 cycles of measurements are recorded in each case.

Coloration and bleaching kinetics testify for very fast coloration and bleaching times of respectively 6 and 5 s for Li—NiO, and 28 and 11 s for WO$_3$. In addition, high optical contrast of 54 and 83% are respectively measured for Li—NiO and WO$_3$.

Figure 7:
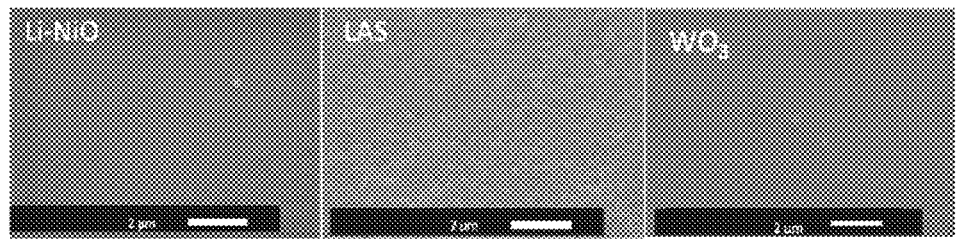
FIG. 7 illustrates scanning electron microscopy images of Li—NiO (left), LAS (center) and WO$_3$ (right) films deposited through USP at 350° C. on Glass/FTO substrates. All layers testify for high homogeneity, uniformity and smoothness.

Example of morphological properties of the electrochromic and electrolytic films obtained by the process according to the invention Scanning electron microscopy measurements are performed on Li—NiO, LAS and WO3 films deposited through USP at 350° C. on a glass/FTO substrate. FIG. 7 illustrates the very high degree of smoothness, uniformity and homogeneity in each case and all over the surfaces, as well as relatively low haze values comprised between 1 and 2%.

Example of Multilayer Stacking Obtained by the Process According to the Invention Consequently we can use a "tandem" combination of a WO$_3$ working electrode and a Li—NiO counter electrode (or in reverse order) in different configurations. In the particular case of a stacking construction, Li$^+$ insertion/extraction processes are achieved through the intermediate electrolyte layer, acting thus as a Li$^+$ ion tank.

The USP deposition process (at atmospheric pressure) according to the invention can thus advantageously be used to prepare a multilayer stacking construction through the progressive stacking of the different layers, which can be proceeded for example following the deposition order Li—NiO/LAS/WO$_3$ (as presented on Scheme 1) as well as WO$_3$/LAS/Li—NiO.

Figure 8A:
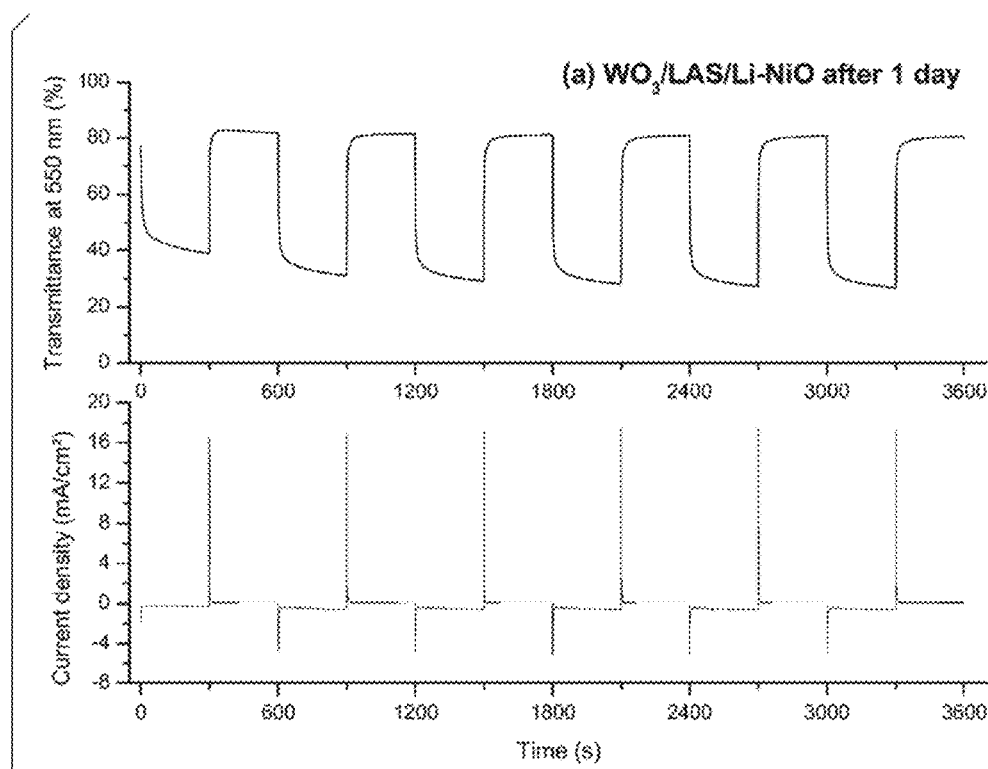
FIG. 8 consists of FIG. 8A and FIG. 8B and illustrates the evolution of transmittance at 550 nm related to double-step chronoamperometry curves recorded 1 day (Figure SA) and 1 year (Figure SB) after the whole sample preparation. Potential values of −2.0 and +2.0 V are consecutively applied for 5 (1 day; Figure SA) or 3 min (1 year.
FIG. 8B) (each step) for promoting the coloration and bleaching (respectively) of the device. 6 cycles of measurements are recorded in each case.
Figure 8B:
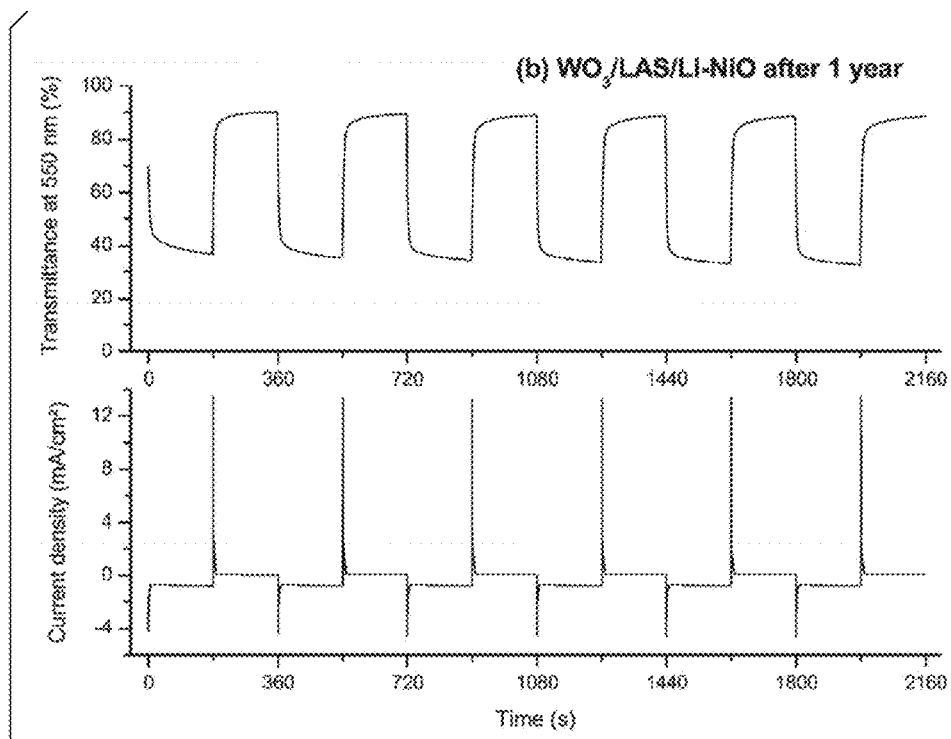

An electrochromic evaluation of such "all solid" multilayer stacking construction may be achieved through a chronoamperometry measurement performed on a WO$_3$/LAS/Li—NiO stacking (illustrative case), which was continuously deposited through USP at 350° C. on a glass/FTO substrate, and covered (cathodic arc deposition) by a thin Au layer for conductivity purposes. WO$_3$ layer on glass/FTO substrate acts thus as working electrode, while Li—NiO layer connected to Au top coating acts as counter electrode. FIG. 8 illustrates the evolution of transmittance at 550 nm related to double-step chronoamperometry curves recorded 1 day (FIG. 8a) and 1 year (FIG. 8b) after the whole sample preparation. Potential values of −2.0 and +2.0 V are consecutively applied for 5 (1 day; FIG. 8a) or 3 min (1 year; FIG. 8b) (each step) for promoting the coloration and bleaching (respectively) of the device. 6 cycles of measurements are recorded in each case. A good global coloration contrast is obtained (up to 54%), while coloration/bleaching kinetics are kept within several dozens of seconds, with fastest values of 12 s for coloration and 32 s for bleaching. Such performances remain globally stable after 1 year of sample ageing in ambient atmosphere (FIG. 8a vs. 8b), which proves the durability of the device. The device also testifies for high voltammetric cycling stability and reversibility. At least 1500 cycling (optically monitored) have been achieved.

The present invention also allows for the preparation of multilayer stacking following other processes, for instance via the encapsulation of an electrolytic layer made of polymer gel between WO$_3$ and Li—NiO electrochromic layers USP-deposited on Glass/FTO substrates.

The present invention also allows for the preparation of a device based on a single electrochromic Li—NiO or WO$_3$ layer deposited by USP on a Glass/FTO substrate, and acting as working electrode. This can be further encapsulated with an electrolytic layer (e.g. polymer gel) on a Glass/FTO substrate acting as counter electrode.

The invention claimed is:

1. A process of making an electrolytic film by Ultrasonic Spray Pyrolysis (USP) deposition on a substrate comprising:
    mixing a surfactant with an aqueous precursor solution comprising an electrolytic component to provide a spray solution;
    introducing the spray solution into an ultrasonic spray deposition nozzle at a constant flow rate between 0.1 mL/min and 2 mL/min and applying an ultrasonic frequency between 80 and 120 kHz to generate atomized droplets of the precursor solution;
    entraining the atomized droplets in a controlled jet of air as gas carrier at a pressure between 0.50 to 2.0 psi, onto a pre-heated substrate at a temperature of 200 to 450° C.;
    thermally converting the atomized droplets when depositing onto the pre-heated substrate to generate the electrochromic film or the electrolytic film;
    wherein the electrolytic component is a proton source or an alkali ion source.

2. The process according to claim 1 wherein the constant flow rate is between 0.1 and 0.4 mL/min with a spray nozzle.

3. The process according to claim 1 wherein the film deposition onto the preheated substrate is designed according to a three-dimensional pattern by the ultrasonic spray deposition nozzle.

4. The process according to claim 1 wherein the three-dimensional pattern follows a S shape arc move in the X-Y plane.

5. The process according to claim 1 wherein both steps of entraining the atomized droplets and their thermal conversion onto the pre-heated substrate are repeated between 2 to 16 times, in order to generate a homogenous electrolytic layer.

6. The process according to claim 1 wherein the electrolytic film is selected from lithium aluminosilicate (LAS), lithium borosilicate (LBS) or lithium phosphosilicate (LPS).

7. The process according to claim 1 wherein the surfactant is polyethylene glycol.

8. The process according to claim 1 wherein the ultrasonic frequency is 120 kHz.

9. The process according to claim 1 wherein the carrier air gas pressure is 0.90 psi.

10. The process according to claim 1 wherein the substrate is pre-heated at a temperature of 350° C.

11. The process according to claim 1 wherein the substrate is fluorine doped tin oxide coated glass.

12. The process according to claim 1, wherein a distance between ultrasonic spray deposition nozzle and the pre-heated substrate is 3-6 cm.

13. The process according to claim 1, wherein the electrolytic component is a lithium ion source selected from lithium nitrate, lithium chloride, lithium sulfate or a combination thereof.

14. The process according to claim 1 further comprising:
mixing a surfactant with an aqueous precursor solution comprising an electrochromic component to provide a spray solution;
introducing the spray solution into an ultrasonic deposition nozzle at a constant flow rate between 0.1 mL/min and 2 mL/min and applying an ultrasonic frequency between 80 and 120 kHz to generate atomized droplets of the precursor solution;
entraining the atomized droplets in a controlled jet of air as gas carrier at a pressure between 0.50 to 2.0 psi, onto a pre-heated substrate at a temperature of 200 to 450° C.;
thermally converting the atomized droplets when depositing onto the pre-heated substrate to generate an electrochromic film.

15. The process according to claim 14 wherein the electrochromic film comprises a metal oxide selected from tungsten oxide, molybdenum oxide, niobium oxide, titanium oxide, copper oxide, chromium oxide, manganese oxide, vanadium oxide, tantalum oxide, iron oxide, cobalt oxide, nickel oxide, ruthenium oxide, rhodium oxide, palladium oxide, osmium oxide, iridium oxide, platinum oxide or a combination thereof.

16. The process according to claim 15 wherein the electrochromic film further comprises a dopant element selected from hydrogen ion, deuterium ion, lithium ion, sodium ion, potassium ion, rubidium ion, caesium ion, molybdenum ion, titanium ion, vanadium ion, calcium ion, barium ion, magnesium ion, strontium ion, tungsten ion, nickel ion and combination thereof.

17. The process according claim 14 wherein the aqueous precursor solution comprising an electrochromic component comprises an organic or inorganic salt or complex, selected from nitrate, chloride, acetate, acetylacetonate, citrate, sulphate, peroxometalate, containing metal selected from tungsten, molybdenum, niobium, titanium, copper, chromium, manganese, vanadium, tantalum, iron, cobalt, nickel, ruthenium, rhodium, palladium, osmium, iridium, platinum or a combination thereof.

18. The process according to claim 14 wherein the electrochromic layer is lithium doped nickel oxide or tungsten trioxide.

19. The process according to claim 14 wherein the surfactant is polyethylene glycol and wherein the weight ratio of the electrochromic component to polyethylene glycol in the aqueous precursor solution is between 10:1 and 1:10.

* * * * *